US012415729B2

(12) United States Patent
Yuge et al.

(10) Patent No.: US 12,415,729 B2
(45) Date of Patent: Sep. 16, 2025

(54) CARBON NANOTUBE SEPARATION METHOD AND SEPARATION APPARATUS

(71) Applicants: NEC Corporation, Tokyo (JP); Meijo University, Nagoya (JP)

(72) Inventors: Ryota Yuge, Tokyo (JP); Sumio Iijima, Aichi (JP)

(73) Assignees: NEC CORPORATION, Tokyo (JP); MEIJO UNIVERSITY, Nagoya (JP)

( * ) Notice: Subject to any disclaimer, the term of this patent is extended or adjusted under 35 U.S.C. 154(b) by 651 days.

(21) Appl. No.: 17/629,156

(22) PCT Filed: Jul. 20, 2020

(86) PCT No.: PCT/JP2020/028046
§ 371 (c)(1),
(2) Date: Jan. 21, 2022

(87) PCT Pub. No.: WO2021/015159
PCT Pub. Date: Jan. 28, 2021

(65) Prior Publication Data
US 2022/0267152 A1 Aug. 25, 2022

(30) Foreign Application Priority Data
Jul. 24, 2019 (JP) .................. 2019-136031

(51) Int. Cl.
*B32B 9/00* (2006.01)
*B03C 5/02* (2006.01)
(Continued)

(52) U.S. Cl.
CPC .............. *C01B 32/172* (2017.08); *B03C 5/02* (2013.01); *C01B 32/159* (2017.08);
(Continued)

(58) Field of Classification Search
CPC .... Y10T 428/30; C01B 32/159; C01B 32/174
(Continued)

(56) References Cited

U.S. PATENT DOCUMENTS

2006/0046602 A1* 3/2006 Kang .................. H01J 9/025
445/51
2009/0283405 A1 11/2009 Schmidt et al.
(Continued)

FOREIGN PATENT DOCUMENTS

JP      05-044188 A    2/1993
JP      09-041280 A    2/1997
(Continued)

OTHER PUBLICATIONS

International Search Report of PCT/JP2020/028046 dated Oct. 6, 2020 [PCT/ISA/210].

(Continued)

*Primary Examiner* — Daniel H Miller
(74) *Attorney, Agent, or Firm* — Sughrue Mion, PLLC (57) ABSTRACT

The object of the present invention is to provide a separation method and a separation apparatus for carbon nanotubes capable of separating a mixture of carbon nanotubes in a highly efficient, inexpensive and simple manner. The present invention relates to a carbon nanotube separation method comprising: a step of preparing a dispersion liquid including a mixture of two or more types of carbon nanotubes having different zeta potentials; a step of introducing the dispersion liquid into a flow path formed between a first electrode having holes for allowing the dispersion liquid to pass therethrough, and a second electrode arranged so as to face the first electrode; a step of applying a DC voltage to the first electrode and the second electrode while the dispersion liquid is flowing through the flow path; and, a step of continuously collecting a dispersion liquid including carbon
(Continued)

nanotubes separated to a first electrode side upon application of the voltage from an opposite side to the flow path with respect to the first electrode, and at the same time, continuously collecting a dispersion liquid including carbon nanotubes separated to a second electrode side from a downstream side of the flow path.

19 Claims, 3 Drawing Sheets

(51) Int. Cl.
    *C01B 32/159*     (2017.01)
    *C01B 32/172*     (2017.01)
    *C01B 32/174*     (2017.01)
    *C25D 13/02*     (2006.01)

(52) U.S. Cl.
    CPC ............ *C01B 32/174* (2017.08); *C25D 13/02* (2013.01); *C01B 2202/02* (2013.01); *C01B 2202/08* (2013.01); *C01B 2202/22* (2013.01)

(58) Field of Classification Search
    USPC ......................................................... 428/408
    See application file for complete search history.

(56) References Cited

U.S. PATENT DOCUMENTS

| | | | |
|---|---|---|---|
| 2010/0101983 | A1 | 4/2010 | Butler et al. |
| 2016/0229695 | A1 | 8/2016 | Yoshiwara |
| 2016/0380274 | A1 | 12/2016 | Wu et al. |
| 2017/0096339 | A1 | 4/2017 | He et al. |

FOREIGN PATENT DOCUMENTS

| | | | | |
|---|---|---|---|---|
| JP | 2001-093404 | A | 4/2001 | |
| JP | 2005-097003 | A | 4/2005 | |
| JP | 2005-193362 | A | 7/2005 | |
| JP | 2005-334865 | A | 12/2005 | |
| JP | 2005334865 | | * 12/2005 | |
| JP | 2008-055375 | A | 3/2008 | |
| JP | 2011-168417 | A | 9/2011 | |
| JP | 2015-040358 | A | 3/2015 | |
| JP | 2017-056579 | A | 3/2017 | |
| JP | 6212677 | B1 * | 10/2017 | ........... C01B 32/159 |
| JP | 6237965 | B1 | 11/2017 | |
| WO | 2011/108545 | A1 | 9/2011 | |
| WO | 2015/045418 | A1 | 4/2015 | |
| WO | 2018/158830 | A1 | 9/2018 | |
| WO | 2019/073531 | A1 | 4/2019 | |

OTHER PUBLICATIONS

Office Action issued Feb. 28, 2023 in Japanese Application No. 2021-534020.
Walt A. De Heer, et al., "Aligned Carbon Nanotube Films: Production and Optical and Electronic Properties", Science, May 12, 1995, vol. 268, pp. 845-847 (4 pages).
Darman Mitchell Rock, "Shear-Aligned Carbon Nanotube Mats", Washington State University, May 2018 (138 pages).
Office Action issued Sep. 3, 2024 in U.S. Appl. No. 17/629,244.
Jinrui Zhang, et al., "Preparation of vertically aligned carbon nanotube/polyaniline composite membranes and the flash welding effect on their supercapacitor properties", RSC Adv., 2016, vol. 6, pp. 98598-98605 (8 pages total).
Lanticse et al., "Shear-induced preferential alignment of carbon nanotubes resulted in anisotropic electrical conductivity of polymer composites", Carbon, vol. 44, 2006, pp. 3078-3086.
Non-Final Office Action issued Apr. 3, 2025 in U.S. Appl. No. 17/629,244.

* cited by examiner

FIG.3 (front view)　　　　FIG.3 (side view)

CARBON NANOTUBE SEPARATION METHOD AND SEPARATION APPARATUS

CROSS REFERENCE TO RELATED APPLICATIONS

This application is a National Stage of International Application No. PCT/JP2020/028046 filed on Jul. 20, 2020, claiming priority based on Japanese Patent Application No. 2019-136031 filed on Jul. 24, 2019.

TECHNICAL FIELD

The present invention relates to a separation method and a separation apparatus for separating microparticles having different properties to select only microparticles having the same property, particularly relates to a separation method and a separation apparatus for a mixture of carbon nanotubes (CNTs). Furthermore, the present invention relates to a production method for an aligned carbon nanotube film using the separation method and the separation apparatus described above.

BACKGROUND ART

A semiconducting type and a metallic type are known as physical properties of single-walled carbon nanotubes. For example, a field-effect transistor (FET) has been proposed as an electronic device using semiconducting carbon nanotubes, and the electrical characteristics thereof have been evaluated. The state of carbon nanotubes in an electronic device is roughly classified into a case where a small number of carbon nanotubes are used and a case of an aggregate (thin film) of carbon nanotubes. The former is used for special sensors and the like, and the latter is applied as a flexible transistor to be printed on a plastic film by using a printing technique. However, these transistors do not fully utilize the excellent semiconductor characteristics inherent in single-walled carbon nanotubes because the separation between the semiconducting carbon nanotubes and the metallic carbon nanotubes is insufficient.

On the other hand, integration of carbon nanotube FETs is required for practical use, and the development of a technique for producing large-area thin films of aligned carbon nanotubes, which is the basis of the integration, is also in progress. In order to achieve the creation of such carbon nanotubes and electronic devices, it is essential to first establish a technique for separating semiconducting carbon nanotubes, which is the most important basic technique.

As for the separation technique of microparticles such as carbon nanotubes, a classification method using difference in particle size, a density gradient centrifugation method, an electrophoresis method using adsorption to gel, etc. have already been reported, but some problems have been left in practical use.

For example, Patent Literature 1 describes a method for classifying solid microparticles in suspension using a sedimentation tank. However, since this method is a sedimentary classification technique, that is, a technique based on a technique using the gravity acting on solid microparticles to separate suspension into a supernatant portion containing fine particles and microparticles, and a concentrated portion containing coarse particles and greatly coarse particles, it is difficult to separate microparticles having no difference in mass like metallic carbon nanotubes and semiconducting carbon nanotubes. Further, Patent Literatures 2 to 4 describe methods for separating metallic carbon nanotubes and semiconducting carbon nanotubes by applying an electric field to a dispersion liquid of carbon nanotubes. However, since the methods described in Patent Literatures 2 and 3 are batch type methods, there is a problem that the processing amount is limited and it takes time for separation. Further, the method described in Patent Literature 4 also has a problem in enhancement of the separation accuracy and the processing amount.

Therefore, the establishment of a separation method for semiconducting and metallic carbon nanotubes is a fundamental technology of great industrial importance, but a rapid and inexpensive separation method has not yet been established.

CITATION LIST

Patent Literature

Patent Literature 1: Japanese Patent Laid-Open No. 2005-334865
Patent Literature 2: Japanese Patent No. 6212677
Patent Literature 3: Japanese Patent No. 6237965
Patent Literature 4: Japanese Patent Laid-Open No. 2008-55375

SUMMARY OF INVENTION

Technical Problem

The technology required here is a simple, efficient and inexpensive separation method suitable for mass production. The present invention provides a new and unique separation method and apparatus to satisfy such requirements.

Solution to Problem

One aspect of the present invention relates to a carbon nanotube separation method comprising:
  a step of preparing a dispersion liquid comprising a mixture of two or more types of carbon nanotubes having different zeta potentials;
  a step of introducing the dispersion liquid into a flow path formed between a first electrode having holes for allowing the dispersion liquid to pass therethrough, and a second electrode arranged so as to face the first electrode;
  a step of applying a DC voltage to the first electrode and the second electrode while the dispersion liquid is flowing through the flow path; and
  a step of continuously collecting a dispersion liquid comprising carbon nanotubes separated to a first electrode side upon application of the voltage from an opposite side to the flow path with respect to the first electrode, and at the same time, continuously collecting a dispersion liquid comprising carbon nanotubes separated to a second electrode side from a downstream side of the flow path.

Another aspect of the present invention relates to a separation apparatus for separating two or more types of carbon nanotubes having different zeta potentials, comprising:
  a flow path which is formed between a first electrode having holes for allowing a dispersion liquid to pass therethrough, and a second electrode arranged so as to face the first electrode to cause a dispersion liquid of a mixture of carbon nanotubes to flow therethrough;

a DC voltage power supply for applying one of the first electrode and the second electrode to an anode and applying the other to a cathode; and a first collection port for collecting a permeating liquid which has passed through the first electrode, and a second collection port provided on a downstream side of the flow path.

Another aspect of the present invention relates to a production method for an aligned carbon nanotube film comprising:

a step of preparing a dispersion liquid comprising a mixture of two or more types of carbon nanotubes having different zeta potentials;

a step of introducing the dispersion liquid into a flow path formed between a first electrode having a separator stacked thereon on a flow path side, and has holes for allowing the dispersion liquid to pass therethrough, and a second electrode arranged so as to face the first electrode;

a step of applying a DC voltage to the first electrode and the second electrode while the dispersion liquid is flowing through the flow path; and a step of causing a part of a dispersion solvent liquid of the dispersion liquid to permeate through the first electrode, whereby one ends of at least some of carbon nanotubes separated to the first electrode side are fixed in pores of a separator stacked on the first electrode or in the vicinity of the pores, and at the same time, aligning the carbon nanotubes having the one ends fixed to the separator in one direction on the separator by flow of a dispersion liquid flowing in a downstream direction through the flow path.

Advantageous Effect of Invention

The present invention provides a method and an apparatus for separating carbon nanotubes capable of separating a mixture of carbon nanotubes in a highly efficient, inexpensive and simple manner.

BRIEF DESCRIPTION OF DRAWINGS

FIG. 3 (front view) is a schematic diagram of a liquid flow adjusting plate having a "drainboard-shaped" structure to allow the flow to flow in parallel as seen from the dispersion liquid inflow port side. FIG. 3 (side view) is a streamline structure designed to smooth the flow near the inflow port. The arrow indicates the flow direction of the dispersion liquid.

DESCRIPTION OF EMBODIMENTS

The present invention relates to an apparatus and a method for separating carbon nanotubes by using the difference in zeta potential of carbon nanotubes in a carbon nanotube dispersion liquid. For example, single-walled carbon nanotubes comprise semiconducting type and metallic type in a mixed state, and it is necessary to separate them depending on the purpose of use. It is expected that the zeta potential of semiconducting carbon nanotubes is negatively charged, while that of metallic carbon nanotubes is slightly negatively charged or hardly charged. An embodiment of an apparatus and a method for efficiently separating semiconducting carbon nanotubes—metallic carbon nanotubes using such difference in zeta potential is described below with reference to FIG. 1.

[Separation Apparatus]

Figure 1:
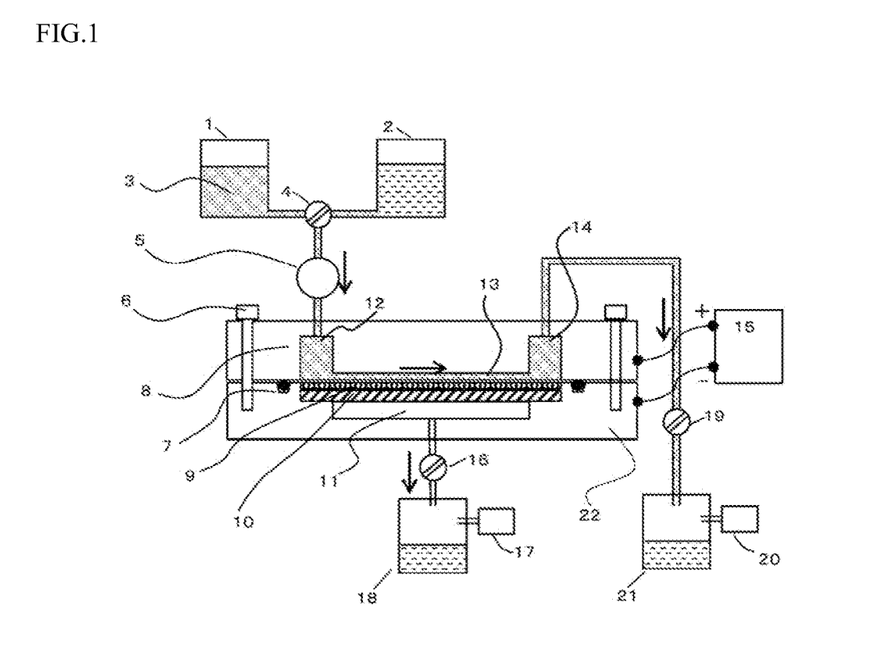
FIG. 1 is a cross-sectional view of a carbon nanotube separation apparatus.
Figure 2:
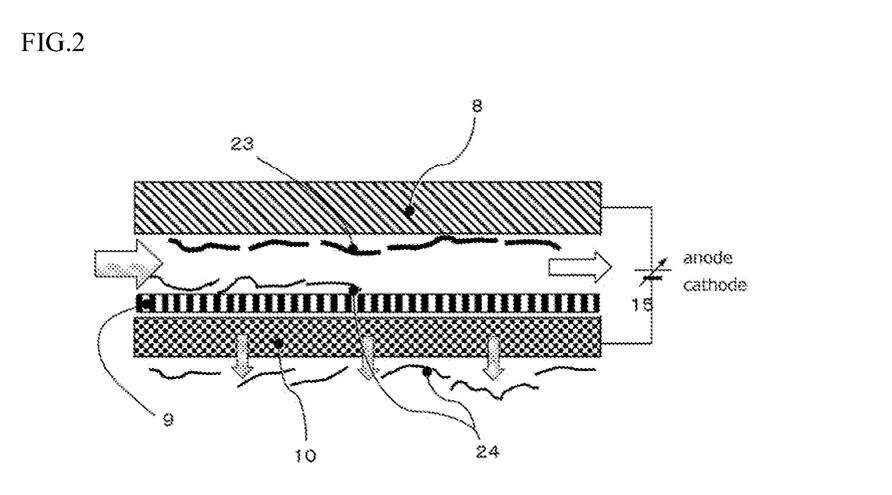
FIG. 2 is a schematic diagram of a separation method for semiconducting carbon nanotubes and metallic carbon nanotubes.

The separation apparatus of the present embodiment includes a flow path (13) for causing a dispersion liquid of a carbon nanotube mixture to flow, an inflow port (12) for introducing the dispersion liquid of the carbon nanotube mixture into the flow path (13), two electrodes installed so as to face each other across the flow path (13), that is, an electrode (10) having holes as a first electrode and a liquid flow adjusting plate (8) as a second electrode, a DC voltage power supply (15) for applying a voltage to the two electrodes, and collection ports for separately collecting the carbon nanotubes separated by the application of the voltage, that is, a first collection port (11) provided on the outside of the electrode (10) having the holes (on the opposite side to the flow path (13)) and a second collection port (14) provided on the downstream side of the flow path (13).

In the separation apparatus of FIG. 1, a separator (9) is stacked on the flow path side of the electrode (support screen) (10) having the holes.

The separation apparatus of FIG. 1 further includes a dispersion liquid container (1) and, if necessary, a cleaning water container (2) which are switchably connected to the inflow port (12) of the flow path with a three-way cock (4) interposed therebetween, and a first separated CNT collection container (18) and a second separated CNT collection container (21) which are connected to the first collection port (11) and the second collection port (14), respectively. Further, a liquid feeding pump (5) is connected to the inflow port (12) side, and liquid flow (flow rate) adjusting valves (16, 19) and a suction pump (17, 20) are connected to the first and second collection ports (11, 14) sides, respectively.

In the separation apparatus of the present embodiment, at least one of the two electrodes is an electrode having holes through which the dispersion liquid is allowed to pass.

The electrode having the holes (the first electrode (10) in FIG. 1) is not particularly limited as long as it has holes through which the dispersion liquid is allowed to pass, examples of the form thereof include mesh-type ones such as a woven wire mesh and an expanded metal, a punching metal and the like, and examples of the shape thereof include flat plate-shaped ones. The hole size and shape of the electrode having the holes are not particularly limited as long as the holes allow the microparticles (or micelles thereof) to be separated to pass therethrough, and examples of the holes include holes in which the hole diameter (when the holes have shapes other than a circle, the maximum diameters of the shapes) is equal to 250 nm or more, preferably 20 μm or more, and 250 μm or less, preferably 200 μm or less, more preferably 50 μm or less, and the aperture ratio is equal to 5 to 90%, preferably 10 to 70%. The hole diameter and the aperture ratio may be appropriately changed in consideration of the flow rate, flow velocity, etc. of the dispersion liquid passing through the electrode having the holes.

A separator may be provided between the two electrodes. The separator is preferably provided on the flow path side of the electrode having the holes described above, and in this case, the electrode having the holes can be configured by a material capable of functioning as an electrode and supporting the separator. Therefore, in the present specification, an electrode having holes may be referred to as a support screen. Insertion of the separator makes it easier to control the flow velocity.

The separator (also referred to as "semiconducting-metallic separator" in the present specification) is not particularly limited as long as it has pores through which a dispersion liquid or a dispersion solvent liquid can pass, but it is preferably a material having insulating properties; examples of such material include a fiber aggregate, a resin porous film, and the like.

When the separation apparatus of the present embodiment is used only to separate a carbon nanotube mixture, the pore diameter of the separator is not particularly limited as long as it has a size which allows the micelles of carbon nanotubes to pass therethrough, but it is equal to, for example, 50 nm to 20 μm, preferably 100 nm to 10 μm, for example, 200 nm to 1 μm. When the hole diameter of the support screen is large, it is also possible to adjust the flow rate and the like of a liquid permeating therethrough by setting the pore diameter of the separator in an appropriate range.

Further, as described later, when the separation apparatus according to the present embodiment is used as a production apparatus for an aligned carbon nanotube film, the separator serves as a base material for fixing the carbon nanotubes. In this case, the pore diameter of the separator may be smaller than that when the separation apparatus of the present embodiment is used only for separation, and for example, it is equal to 1 nm or more, preferably 10 nm to 1000 nm, more preferably 50 to 800 nm, still more preferably 100 to 500 nm, for example, 100 to 300 nm.

Further, when the separation apparatus of the present embodiment is used as a production apparatus for an aligned carbon nanotube film, it is more preferable that the separator is a resin porous membrane which has a plurality of single pores as pores and has a smooth membrane surface. Examples of the resin porous membrane include porous membranes of polycarbonate, polyolefin, fluororesin, polyurethane, polyketone, and polyimide, but it is not limited to these materials. Further, as described later, it is also preferable that the resin porous membrane is components which can be removed by heating or dissolving with a solvent after the production of the aligned film.

One of the two electrodes may be an electrode having no hole. The form of the electrode having no hole is not particularly limited.

In one embodiment, the separation apparatus of the present embodiment may have a structure for adjusting a liquid flow to control the flow of the dispersion liquid in the flow path and facilitate formation of a laminar flow as shown in the example of FIG. 1, in the flow path, preferably on a surface on the flow path side of at least one of the two electrodes. Such a structure is particularly preferable in that the alignment of the aligned film can be more enhanced when the separation apparatus according to the present embodiment is used for production of the aligned carbon nanotube film as described later.

The structure for adjusting the liquid flow is not limited; for example, a structure for controlling the liquid flow of the dispersion liquid, for example, a liquid flow adjusting plate described later may be provided separately from the electrodes in the flow path, preferably on the surface on the flow path side of at least one of the electrodes, or the electrode itself may have the shape of the liquid flow adjusting plate. Either the electrode having holes or the electrode having no hole may have a structure for adjusting the liquid flow, but it is preferable that at least the electrode having no hole has the structure for adjusting the liquid flow, particularly, it is preferable that the electrode having no hole itself is the liquid flow adjusting plate.

The structure of the liquid flow adjusting plate is not particularly limited, but may be, for example, a structure with grooves having a so-called "drainboard-shaped" structure, specifically, a structure having a plurality of grooves extending in a flow direction on the surface on the flow path side. In the present specification, "grooves having the "drainboard-shaped structure"" means a plurality of grooves provided in the flow direction of the flow path, preferably in parallel to each other. The interval between the grooves may be set to, for example, 0.01 to 2 mm, preferably 0.1 to 1 mm, but the interval may be set out of the above range in consideration of the size, usage condition, and purpose of use of the separation apparatus of the present embodiment. Examples of the groove shape include a V-shape, a U-shape, a C-shape, an angular U-shape, and the like, and the U-shape is more suitable from the viewpoint of enhancing the fluidity of the dispersion liquid and the alignment of the carbon nanotube.

Further, a portion on the flow-path inflow port side of the liquid flow adjusting plate may be molded in a streamline-shape in order to smooth the inflow of the dispersion liquid into the flow path, that is, minimize occurrence of turbulent flow. Here, the streamline-shape is a shape in which the cross-sectional area of the flow path is represented by a function decreasing monotonically in a broad sense with respect to the distance, and further means that the function is smooth, that is, the differential function thereof is continuous. Further, it is preferable that the wall surface is continuous and smooth in addition to the cross-sectional area of the flow path.

Figure 3:
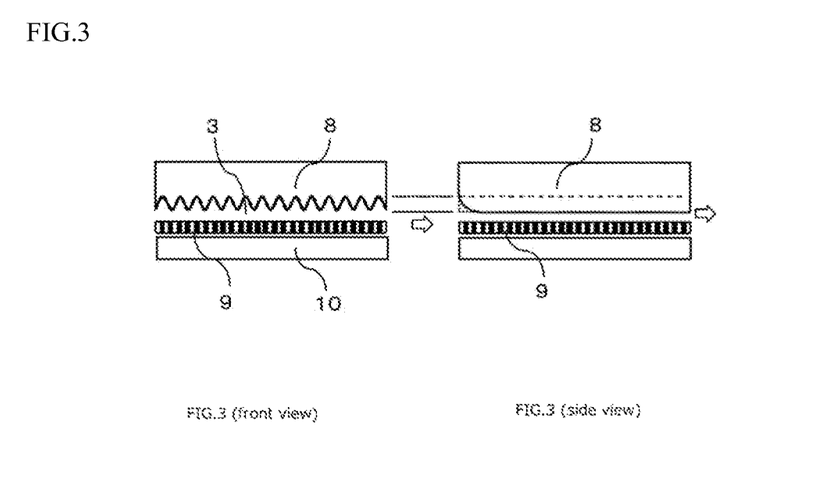

For example, as shown in FIG. 3 (front view), drainboard-shaped grooves are carved on the surface on the flow path side of the liquid flow adjusting plate (8), and devised so that the dispersion liquid flows unidirectionally linearly along the grooves. Further, the inflow port side is devised to be streamline-shaped as shown in FIG. 3 (side view) in order to lubricate the flow.

If an electrode which also functions as such a liquid flow adjusting plate is used as at least one of the two electrodes, preferably as an electrode having no hole, the dispersion liquid flowing in the flow path is less likely to generate turbulent flow and can be controlled to be laminar flow as much as possible, and it is possible to improve the separation accuracy, and also improve the alignment of the aligned film, which will be described later in the production of the aligned film.

The materials of these two electrodes are not particularly limited as long as the materials can function as electrodes, examples thereof include stainless steel, platinum, gold, copper, tungsten and the like, and stainless steel is preferable from the viewpoint of low corrosion and low cost.

In the separation apparatus of the present embodiment, it is preferable that the two electrodes face each other at substantially the same interval from the upstream side to the downstream side of the flow path with the flow path interposed therebetween. The distance between the two electrodes can be set to more than 0 mm, for example 0.01 mm or more, preferably 0.05 to 5 mm, and in some cases 0.1 to 2 mm. Further, the height of the flow path through which the dispersion liquid flows can be set to, for example, 0 mm (for example, the liquid flow adjusting plate having grooves is in contact with the separator, and the dispersion liquid flows through the grooves of the liquid flow adjusting plate) to 5 mm. However, the height of the flow path may be set outside the above range because it can be appropriately set in consideration of the scale of the separation apparatus, the processing amount of the dispersion liquid, the purpose of use of the separation apparatus, the thickness of the semiconducting-metallic separator, and the like.

In the separation apparatus of the present embodiment, the two electrodes are connected to a DC voltage power supply for applying one of them to an anode and applying the other to a cathode. The DC voltage power supply is preferably a variable DC voltage power supply whose voltage can be adjusted in consideration of the properties, shapes, concentrations and the like of microparticles to be separated. As shown in FIG. 1, the DC voltage power supply (15) may be connected to each of an exterior body (22) which is electrically connected to the electrode (10) having holes as the first electrode, and an exterior body (8) which is integrated with the liquid flow adjusting plate as the second electrode, or electrically connected to the liquid flow adjusting plate. When a voltage is applied to the exterior bodies, it is preferable that these exterior bodies are fixed to each other via an insulator such as a rubber O-ring (7) so as not to be electrically connected to each other.

The separation apparatus of the present embodiment has two or more collection ports. In FIG. 1, the first collection port is an opening for collecting a dispersion liquid (also referred to as "permeating liquid" in the present specification) passing through the electrode (10) having the holes, which contains carbon nanotubes separated toward the electrode (10) having the holes as the first electrode by applying a voltage, and is connected to a first separated CNT collection container (18). The second collection port (14) is an opening for collecting a dispersion liquid (also referred to as "non-permeating liquid" in the present specification) flowing in the downstream direction of the flow path (13), which contains carbon nanotubes separated toward the liquid flow adjusting plate (8) as the second electrode by applying a voltage, and is connected to a second separated CNT collection container (21).

FIG. 1 shows the separation apparatus in which the two electrodes include the combination of the electrode (10) having holes through which the dispersion liquid can pass and the electrode having no hole (liquid flow adjusting plate) (8). However, both of the two electrodes may be electrodes having holes, and in this case, a collection port may be provided on the outside (the opposite side to the flow path) of each of the electrodes having the holes. When the carbon nanotube mixture is a mixture of three or more kinds, for example, a branch point (not shown) capable of branching the flow into two or more may be provided on the downstream side of the flow path (13), and a collection port may be provided in each of flow paths branched at the branch point.

[Separation Method and Production Method for Aligned Film]

Next, a separation method according to the present embodiment will be described with reference to FIG. 1 by exemplifying a case where semiconducting carbon nanotubes and metallic carbon nanotubes are separated from a mixture of carbon nanotubes.

A dispersion liquid (3) containing a mixture of carbon nanotubes is continuously introduced from the dispersion liquid container (1) to the flow path (13) formed between two electrodes, that is, the electrode (support screen) (10) having holes as the first electrode and the liquid flow adjusting plate (8) as the second electrode arranged so as to face the first electrode by using a liquid feeding pump (5).

The DC voltage power supply (15) is used to apply the liquid flow adjusting plate (8) to an anode and apply the support screen (10) to a cathode while the introduced dispersion liquid is flowing in a certain direction (a direction indicated by an arrow) in the flow path (13), whereby the carbon nanotubes in the dispersion liquid are separated according to the zeta potential of the carbon nanotubes. The separation mechanism based on the difference in zeta potential is not clear, but it can be estimated as follows.

When a voltage is applied, semiconducting carbon nanotubes (23) forming micelles having a negative zeta potential in the dispersion liquid flows downstream due to the flow of the dispersion liquid (non-permeating liquid) flowing downstream in the flow path in a state where the semiconducting carbon nanotubes (23) are attracted to the vicinity of the anode, that is, the liquid flow adjusting plate (8).

On the other hand, micelles of metallic carbon nanotubes (24) are expected to have a slightly negative zeta potential or be hardly charged in the dispersion liquid. Therefore, the micelles of the metallic carbon nanotubes (24) are hardly affected by the electrophoretic force, but rather tends to move to the cathode, that is, to the support screen (10) side as a reaction of the movement of the semiconducting carbon nanotubes to the anode side. As a result, the metallic carbon nanotubes (24) pass through the support screen (10) together with the flow of the permeating liquid passing through the support screen (10).

The thus-separated metallic carbon nanotubes are continuously collected from the first collection port provided on the outside of the support screen (10) into the first separated CNT container (18), and the thus-separated semiconducting carbon nanotubes are continuously collected from the second collection port (14) provided on the downstream side of the flow path (13) into the second separated CNT container (21).

Of course, in the apparatus of FIG. 1, the sign of the electric field to be applied across the support screen (10) and the liquid flow adjusting plate (8) may be reversed, and in this case, the semiconducting carbon nanotubes are collected into the first separated CNT collection container (18) while the metallic carbon nanotubes are collected into the second separated CNT collection container (21).

Further, by using the separation apparatus of the present embodiment, the separation of carbon nanotubes and the production of an aligned film consisting of the separated carbon nanotubes can be simultaneously performed. A production method for an aligned carbon nanotube film according to the present embodiment will also be described.

In the above-described separation method for carbon nanotubes, upon application of a DC voltage, the metallic carbon nanotubes (24) move together with a liquid flow permeating through the electrode having holes as a cathode, that is, the support screen (10) as described above. At this time, the feeding of the dispersion liquid is adjusted so that not all metallic carbon nanotubes pass through the support screen (10), but at least some metallic carbon nanotubes are fixed onto the separator (9) stacked on the flow path (13) side of the support screen (10). Specifically, one ends of the fibers of the metallic carbon nanotubes are fixed in the pores of the separator (9) or in the vicinity of the pores by the flow of the dispersion liquid or the dispersion solvent liquid passing through the support screen (10), and at the same time, the other ends of the metallic carbon nanotubes whose one ends are fixed are caused to flow in the downstream direction in the flow path (13) by the flow of the dispersion liquid (the liquid flow of the dispersion liquid or the cleaning liquid) flowing in the downstream direction in the flow path (13). As a result, an aligned film in which the metallic carbon nanotubes are aligned in the flow direction of the flow path can be produced on the separator (9).

As a matter of course, if the direction of the electric field to be applied between the liquid flow adjusting plate (8) and the support screen (10) is reversed, an aligned film of semiconducting carbon nanotubes can be manufactured on the separator (9).

In the separation method and the aligned film production method described above, the voltage to be applied may be appropriately set in a range where the carbon nanotubes can be separated while the dispersion liquid flows in the flow path, in consideration of the zeta potential of the carbon nanotubes, the flow rate/flow velocity of the dispersion liquid, the scale of the apparatus, the distance between the electrodes, and the like. The voltage to be applied can be set to, for example, 30 V or less, preferably 20 V or less, in some cases, more preferably 15 V or less, and set to 0.5 V or more, preferably 1 V or more, and more preferably 3 V or more.

Examples of the carbon nanotube separation method using the difference in zeta potential include a free flow electrophoresis method, etc. described in Patent Literatures 2 and 3 described above. Since these methods are batch-type separation methods, it is necessary to use a separation tank having a certain size in order to secure the processing amount, and in this case, the electrodes are also installed apart from each other. In addition, in these methods, the voltage to be applied is required to be set to a low voltage in order to suppress occurrence of a convection phenomenon in the separation tank. Therefore, such a batch-type separation method has a problem that it takes time for separation. However, according to the separation method of the present invention, the dispersion liquid can be continuously supplied, separated, and collected, so that the processing amount can be increased without necessarily increasing the scale of the apparatus. Therefore, the two electrodes can be installed close to each other, and efficient separation can be performed with even a lower applied voltage.

In the separation method of the present embodiment, an electrode having holes through which the dispersion liquid can pass is used for at least one of the two electrodes. As a result, the semiconducting carbon nanotubes and the metallic carbon nanotubes which are separated by applying a voltage can be collected as flows in different directions. Therefore, as compared with the case where a voltage is simply applied to the dispersion liquid flow of a mixture of carbon nanotubes and a branch point is provided in the flow path for separation, the state where the semiconducting carbon nanotubes and the metallic carbon nanotubes are separated from each other can be easily maintained, and the separation accuracy can be enhanced. Further, since the separated state can be easily maintained even when the flow rate of the dispersion liquid is increased, the processing amount can be easily increased.

Here, in the separation method for carbon nanotubes and the aligned film production method of the present embodiment, in order to secure the processing amount while maintaining the separation accuracy and produce a desired aligned film, it is preferable to control the flow rate and flow velocity of the dispersion liquid to be introduced into the flow path, the ratio between the permeating liquid passing through the electrode having holes and the non-permeating liquid flowing in the downstream direction of the flow path, and the flow velocity of them.

In order to adjust the ratio between the permeating liquid and the non-permeating liquid, and especially in order to adjust the ratio of permeation of the dispersion liquid or dispersion solvent liquid permeating to the lower surface side of the separator (9)/the support screen (10) in the embodiment in which the pore diameter of the separator (9) is small like a case where the aligned film is produced simultaneously with the separation, it is necessary to cause a pressure difference between the upper surface side (flow path side) and the lower surface side (first collection port side) of the separator (9)/the support screen (10). Hereinafter, these ratios are also collectively referred to as "permeation ratio".

The adjustment of the flow rate, the flow velocity, the permeation ratio and the pressure difference can be performed, for example, as shown in FIG. 1, by using the liquid feeding pump (5) connected to the inflow port and the suction pumps (17, 20) connected to the collection port. In the following description, a case where the separator is stacked on the electrode having holes and a case where the separator is not stacked may be collectively referred to as "separator (9)/support screen (10)".

The flow rate and the flow velocity, the pressure difference between the upper surface side (flow path side) and the lower surface side (first collection port side) of the separator (9)/support screen (10), and the permeation ratio can be controlled by several methods. Although these are related to one another, the first is an adjustment method for sucking the first collection port (11) side, for example, the pressure on the lower surface side of the separator (9)/support screen (10) is adjusted by sucking from the lower surface side of the separator (9)/support screen (10) using the suction pump (17), and if necessary, using the liquid flow adjusting valve (16) to adjust the amount of a discharged liquid, whereby it is possible to adjust the flow rate and flow velocity of the dispersion liquid flowing through the flow path (13) and the permeation ratio.

The second is an adjustment method for applying pressure from the inflow port side to the dispersion liquid. The dispersion liquid (3) or the cleaning water (2) are fed under pressure by using the liquid feeding pump (5) to adjust the pressure of the upper surface side (flow path side) of the separator (9)/support screen (10), whereby it is possible to adjust the permeation amount through the separator (9)/support screen (10), and the flow rate/flow velocity of the dispersion liquid flowing through the flow path (13).

The dispersion liquid container (1) is installed at an appropriate height above the flow path (13) as a member having the same function as the liquid feeding pump, and the water pressure caused by the difference in height pressurizes the dispersion liquid to be supplied, whereby it is possible to adjust the flow rate/flow velocity for supplying to the flow path (13) and the permeation ratio.

The third is an adjustment method for sucking the dispersion liquid on the second collection port (14) side on the downstream side of the flow path (13), for example, the flow rate of the dispersion liquid flowing out from the second collection port (14) of the flow path (13) is adjusted by sucking from the downstream side of the flow path (13) using the suction pump (20), and as a result, the flow rate and flow velocity of the dispersion liquid supplied to the flow path (13) and the permeation ratio can be adjusted.

FIG. 1 illustrates all of the suction pump (17), the liquid feeding pump (5) (including the water pressure caused by the difference in height) and the suction pump (20), but it is unnecessary to include all of them. For example, even if only the liquid feeding pump (5) (including the water pressure caused by the difference in height) is provided, the dispersion liquid can be supplied to the flow path (13), and the difference in pressure can be generated between the upper surface side and the lower surface side of the separator (9)/support screen (10). The suction pump (17) and the suction pump (20) may be used secondarily. When the liquid feeding pump (5) does not exist and the water pressure caused by the difference in height cannot be expected, the dispersion liquid can be introduced into the flow path by the suction pump (20). However, in this case, it is usually preferable to suck the first collection port (11) side, and therefore it is preferable to provide the suction pump (17).

Further, in order to adjust the flow rate, the flow velocity, and the permeation ratio of the dispersion liquid, the liquid flow adjusting valve may be provided at at least one of a front side of the inflow port (12) of the flow path (13) (as one example, a three-way cock (4) described later can be used therefor), a rear side of the second collection port (14) on the downstream side of the flow path (the liquid flow adjusting valve (19) as one example), and a rear side of the first collection port (11) on the outside of the separator (9)/support screen (10) (the liquid flow adjusting valve (16) as one example). These liquid flow adjusting valves may be provided together with the pumps, but it is also preferable that these liquid flow adjusting valves are provided at places where the pumps are not installed. For example, when only the liquid feeding pump (5) (including the water pressure caused by the difference in height) exists, but the suction pump (17) and the suction pump (20) do not exist, the liquid flow adjustment valves are provided on the rear side of the first collection port (11) and on the rear side of the second collection port (14), whereby the balance of pressure can be established and the flow rate, flow velocity, and permeation ratio of the dispersion liquid can be adjusted.

Next, an example of liquid feeding conditions will be described by using the apparatus shown in FIG. 1 as an example of separating semiconducting carbon nanotubes and metallic carbon nanotubes from a mixture of single-walled carbon nanotubes.

The supply amount of the dispersion liquid to be supplied from the dispersion liquid container (1) depends on the scale of the apparatus, but for example, the supply amount of a dispersion liquid described later can be set to 5 to 500 ml, for example, 10 to 100 ml. This dispersion liquid can be supplied over 5 to 60 minutes, for example 5 to 30 minutes. The flow velocity can be set to, for example, 1 to 100 mm/sec, preferably 5 to 10 mm/sec.

The ratio (volume ratio) between the permeating liquid passing through the separator (9)/support screen (10) and the non-permeating liquid flowing downstream of the flow path (13) can be set, for example, by considering, as a guide, the ratio (weight ratio) between the metallic carbon nanotubes and the semiconducting carbon nanotubes in the mixture before separation. Further, for example, when it is desired to enhance the separation accuracy of any type of carbon nanotubes or the like, the ratio between the permeating liquid and the non-permeating liquid may be appropriately changed.

Further, there will be described examples of the liquid feeding conditions when the separation of semiconducting carbon nanotubes and metallic carbon nanotubes from a mixture of single-walled carbon nanotubes and the production of an aligned film of either type of carbon nanotubes are simultaneously performed by using the separation apparatus shown in FIG. 1.

With respect to the supply amount of the dispersion liquid to be supplied from the dispersion liquid container (1), the supply amount of a dispersion liquid described later can be set to 5 to 500 ml, for example, 10 to 100 ml. This dispersion liquid can be supplied over 5 to 60 minutes, for example 5 to 30 minutes. The flow velocity can be set to 1 to 100 mm/sec, preferably 5 to 10 mm/sec.

When the separation of carbon nanotubes and the production of an aligned film are performed at the same time, the ratio between the liquid flow of the dispersion liquid in the flow path direction and the liquid flow of the dispersion solvent liquid permeating through the separator (9)/support screen (10) can be adjusted so that the liquid flow amount of the dispersion solvent liquid permeating through the separator (9)/support screen (10) is equal to, for example, 30 to 90% by volume, preferably 40 to 80% by volume, more preferably 55 to 70% by volume of the supplied dispersion liquid although the ratio depends on the flow velocity, the concentration of the carbon nanotubes and the like. By controlling the permeation ratio in this way, one ends of the carbon nanotubes can be fixed in the pores of the separator or in the vicinity of the pores, and at the same time, the alignment of the carbon nanotubes can be enhanced by the liquid flow of the dispersion liquid in the flow path direction. Here, the vicinity of the pores means a range in which one ends of the carbon nanotubes can be fixed by the flow into the pores, and it is a range within 2 μm from the outer edges of the pores, for example, a range of 400 nm from the outer edges of the pores although it depends on the pore diameter, the flow velocity of the dispersion liquid and the like.

Note that these liquid feeding conditions can be appropriately adjusted in consideration of the apparatus and the dispersion liquid to be used, the mixing ratio of the metallic type/semiconducting type in the carbon nanotube mixture, the characteristics of an aligned film to be produced, and the like, and they may be out of the above range.

According to the separation method of the present embodiment, the semiconducting carbon nanotubes and the metallic carbon nanotubes can be separated by a quick and low-cost method. Therefore, when the separation method of the present embodiment is used, it is possible to produce carbon nanotubes comprising semiconducting carbon nanotubes or metallic carbon nanotubes in a desired ratio (including 100%).

The separation method of the present embodiment is not limited to the case where the carbon nanotubes are completely separated by one separation processing, but may be performed as a method for increasing the ratio of metallic carbon nanotubes or the ratio of semiconducting carbon nanotubes. In such a case, the separation ratio may be increased to a desired range by repeating the separation processing by the separation method according to the present embodiment. Alternatively, any one of the flow of the permeating liquid from the first collection port and the flow of the non-permeating liquid from the second collection port may be circulated in the dispersion liquid container (1) to continue the separation processing until a desired separation ratio can be achieved.

For example, from the viewpoint of application to electronic devices such as FETs, it is preferable that the ratio of semiconducting carbon nanotubes, preferably single-walled semiconducting carbon nanotubes, is high, and the separation processing by the separation method of the present embodiment is performed, for example, until the ratio of the single-walled semiconducting carbon nanotubes in the total amount of the carbon nanotubes is more than 67% by mass, preferably 80% by mass or more, more preferably 90% by mass or more, and in some cases, further more preferably 99% by mass or more.

On the other hand, from the viewpoint of application to highly conductive thin films having a low sheet resistance, it is preferable that the ratio of metallic carbon nanotubes is high, and the separation processing by the separation method of the present embodiment is performed, for example, until the ratio of the metallic carbon nanotubes in the total amount of the carbon nanotubes is more than 34% by mass, preferably 50% by mass or more, more preferably 70% by mass or more, in some cases 80% by mass or more, further preferably 90% by mass or more, and particularly preferably 99% by mass or more.

Further, in the present specification, the case where the metallic carbon nanotubes and the semiconducting carbon nanotubes are separated from each other has been described as an example, but according to the separation method of the present embodiment, if the zeta potentials are different, a mixture of three or more kinds can also be separated. In this case, for example, a branch point may be provided on the downstream side of the flow path (13), and a collection port may be provided in each of flow paths branched at the branch point.

Further, the embodiment in which the separation of the carbon nanotubes and the production of the aligned film of the separated carbon nanotubes are simultaneously performed by using the separation apparatus and the separation method of the present embodiment may further include the following steps.

After the carbon nanotubes are fixed and aligned on the separator (9) as described above, the present embodiment may execute a step of causing the cleaning water (2) to flow into the flow path (13). This step can be performed, for example, by using the three-way cock (4) in FIG. 1 to switch the feeding of the dispersion liquid (3) to the feeding of the cleaning water (2). By causing the cleaning water (2) to flow through the flow path (13) as described above, it is possible to enhance the alignment of the aligned carbon nanotube film, perform cleaning, remove unaligned carbon nanotubes and the like. Examples of the cleaning water (2) include a dispersion solvent liquid used for preparing a dispersion liquid.

Further, the carbon nanotubes are fixed and aligned on the separator (9) as described above, and after that, in some cases, the present embodiment may include a step of causing air or an appropriate gas (for example, an inert gas such as nitrogen or argon) to flow through the flow path (13) after causing the cleaning water flow through the flow path (13), thereby drying an aligned carbon nanotube film. In order to perform this step, although not shown in FIG. 1, the separation apparatus may be provided with a gas supply device, a flow path switching device, a gas flow rate control device, and the like.

Further, the carbon nanotubes are fixed and aligned on the separator (9) as described above, and after that, in some cases, the present embodiment may further include a step of causing the cleaning water (2), a gas or the like to flow through the flow path (13), and then collecting the aligned carbon nanotube film formed on the separator (9) by an appropriate method. Examples of the method for collecting the aligned film from the separator (9) include a method for peeling the aligned film from the separator, a method for removing the separator by heating or dissolving with an appropriate solvent, or the like. A relatively thick thin film can be treated as a self-supporting film, and in the case of an ultrathin film, it may be transferred onto a suitable substrate.

Here, with respect to the separator (9), if a resin porous membrane having a smooth surface is used as the separator (9), a smooth thin film having a uniform thickness can be easily obtained, which is advantageous in, for example, use in electronic devices, transfer onto other substrates, and the like. It is also preferable that the resin is a component that can be removed by heating or eluting with an appropriate solvent after the formation of the carbon nanotube thin film. For example, when a polycarbonate resin porous membrane is used as the separator, it can be dissolved and removed with a solvent such as caustic soda after the formation of the carbon nanotube thin film. Further, when a resin porous membrane having a plurality of single pores as pores is used, there is also an advantage that the alignment property and surface density of the carbon nanotubes can be easily controlled.

[Carbon Nanotube Dispersion Liquid]

The carbon nanotube dispersion liquid used in the separation apparatus and the separation method according to the present embodiment, and in the production of an aligned film using the apparatus and method will be described.

The carbon nanotubes may be any of single-walled, double-walled, multi-walled, or a mixture thereof. FIG. 1 shows an apparatus and a method for separating two types of carbon nanotubes, but a mixture of three or more types of carbon nanotubes can also be separated using the separation apparatus and the separation method according to the present embodiment, as long as the zeta potentials thereof are different.

In addition, carbon nanotubes in which some of the carbons of the carbon nanotubes are substituted with any functional group, or carbon nanotubes that are modified with any functional group may also be used. Examples of the functional group include amino group, carboxyl group, hydroxyl group, carbonyl group and the like. When the production of an aligned film is performed at the same time as the separation, for example, carbon nanotubes with amino groups may be used to improve adhesion to the separator, which may result in a smoother film.

The diameter of carbon nanotubes is not particularly limited, and is generally 0.6 nm or more, preferably 0.8 nm or more, and 1 nm or more, and generally 50 nm or less, preferably 20 nm or less, more preferably 10 nm or less.

The length of the carbon nanotubes is not particularly limited and can be appropriately selected in consideration of the intended applications of the isolated carbon nanotubes and the like, and can be generally 0.1 μm or more, preferably 1 μm or more, and in some cases more preferably 10 μm or more. The upper limit of the length can be appropriately determined in consideration of the scale of the separation apparatus and the like, and is generally equal to the length of the flow path or shorter, preferably 50 mm or less, more preferably 20 mm or less, even more preferably 1 mm or less. When the length of the carbon nanotubes is 0.5 μm or more, it is easier to obtain a homogeneous and large-area thin films when, for example, producing an aligned film at the same time as separation. It is also more preferable that the length is 10 mm or less in the view point of ease of synthesis or availability.

As the carbon nanotube dispersion liquid, a dispersion liquid made by dispersing carbon nanotubes in a dispersion solvent liquid is used. Examples of the dispersing solvent liquid include a solution in which a dispersing aid to assist dispersion is added to a dispersion medium.

The concentration of carbon nanotubes can be appropriately selected, and for example, from the viewpoint of balancing the improvement of processing volume and the suppression of carbon nanotube aggregation, carbon nanotubes are preferably added to a dispersion solvent liquid at a concentration of 1 wtppb or more to 500 wtppb or less, more preferably 10 wtppb or more to 100 wtppb or less. In addition, as described below, during the process of preparing a carbon nanotube dispersion liquid, the dispersion liquid can be purified by separating and removing carbon nanotubes that are not dispersed by ultracentrifugation and the like, and the concentration of carbon nanotubes in the dispersion liquid after purification is, for example, 500 wtppm or more and 1000 wtppm or less.

When the separation apparatus and the separation method of the present embodiment are used to produce an aligned film at the same time of conducting the separation, the concentration of carbon nanotubes in the dispersion medium can be, for example, 1 wtppb or more to 500 wtppb or less, more preferably 10 wtppb or more to 100 wtppb, and the concentration in the dispersion medium after the purification process is preferably, for example, 100 wtppb or more to 5000 wtppb or less, and more preferably 500 wtppb or more to 1000 wtppb or less.

The concentration of carbon nanotubes in the carbon nanotube dispersion liquid can be appropriately set in consideration of the separation efficiency, the target processing volume, or the film thickness and areal density of the thin film to be produced, and may be set to outside the above range.

The dispersion medium is not particularly limited, as long as it allows carbon nanotubes to disperse, examples of which may include water, heavy water, organic solvents (for example, NMP, DMF, DMSO and the like), an ionic liquid and others, and water and heavy water are more preferred.

The dispersing aid is preferably a nonionic surfactant.

The nonionic surfactant may be appropriately selected, and it is preferred to use nonionic surfactants constituted by a hydrophilic portion which is not ionized and a hydrophobic portion such as an alkyl chain, for example, nonionic surfactants having a polyethylene glycol structure exemplified by polyoxyethylene alkyl ethers, and alkyl glucoside based nonionic surfactants, singly or in combination. As such a nonionic surfactant, polyoxyethylene alkyl ether represented by Formula (1) is preferably used. In addition, the alkyl moiety may have one or a plurality of unsaturated bonds.

$$C_nH_{2n+1}(OCH_2CH_2)_mOH \quad (1)$$

wherein, n=preferably 12 to 18, and m=10 to 100, and preferably 20 to 100.

In particular, a nonionic surfactant specified by polyoxyethylene (n) alkyl ether (wherein n=20 or more and 100 or less, and the alkyl chain length is C12 or more and C18 or less) such as polyoxyethylene (23) lauryl ether, polyoxyethylene (20) cetyl ether, polyoxyethylene (20) stearyl ether, polyoxyethylene (10) oleyl ether, polyoxyethylene (10) cetyl ether, polyoxyethylene (10) stearyl ether, polyoxyethylene (20) oleyl ether, polyoxyethylene (100) stearyl ether is more preferred. Commercially available examples may include Brij based surfactants such as Brij S100, Brij L23, Brij C20, Brij S20, Brij 010, Brij C10, Brij S10, Brij 020, Brij S100 and others. In addition, N,N-bis[3-(D-gluconamido)propyl]deoxycholamide, n-dodecyl β-D-maltoside, octyl β-D-glucopyranoside, and digitonin may also be used.

As the nonionic surfactant, Tween based surfactants such as polyoxyethylene sorbitan monostearate (molecular formula: $C_{64}H_{126}O_{26}$, trade name: Tween 60, manufactured by Sigma-Aldrich, etc.), polyoxyethylene sorbitan trioleate (molecular formula: $C_{24}H_{44}O_6$, trade name: Tween 85, manufactured by Sigma-Aldrich, etc.), Triton based surfactants such as octylphenol ethoxylate (molecular formula: $C_{14}H_{22}O(C_2H_4O)_n$, n=1 to 10, trade name: Triton X-100, manufactured by Sigma-Aldrich, etc.), polyoxyethylene (40) isooctylphenyl ether (molecular formula: $C_8H_{17}C_6H_{40}(CH_2CH_{20})_{40}H$, trade name: Triton X-405, manufactured by Sigma-Aldrich, etc.), poloxamer (molecular formula: $C_5H_{10}O_2$, trade name: Pluronic, manufactured by Sigma-Aldrich, etc.), polyvinyl pyrrolidone (molecular formula: $(C_6H_9NO)_n$, n=5 to 100, manufactured by Sigma-Aldrich, etc.) may also be used.

The concentration of the surfactant in the dispersion solvent liquid is preferably from the critical micelle concentration or more, and generally 10 times or more, preferably 50 times or more of the critical micelle concentration, for example 0.05% by mass or more, and preferably 5% by mass or less, more preferably 2% by mass or less. As used herein, the critical micelle concentration (CMC) refers to the concentration serving as an inflection point of the surface tension measured by, for example, changing the concentration of an aqueous surfactant solution using a surface tensiometer such as a Wilhelmy surface tensiometer at a constant temperature. As used herein, the "critical micelle concentration" is a value under atmospheric pressure at 25° C.

The method for preparing the carbon nanotube dispersion liquid is not particularly limited, and conventionally known methods can be appropriately employed. Examples thereof include a method in which a mixture comprising carbon nanotubes, and a dispersion solvent liquid comprising a dispersion medium and a dispersing aid is subjected to sonication to sufficiently separate aggregated carbon nanotubes. In addition to or instead of the sonication, carbon nanotubes may be dispersed by a mechanical shear force. In addition, after the dispersion process, carbon nanotubes not sufficiently dispersed may be separated and removed using an ultracentrifugation treatment or the like. Carbon nanotubes are preferably dispersed apart from each other, but in some cases, a plurality of carbon nanotubes may gather to form a bundle.

[Aligned Carbon Nanotube Film]

Furthermore, one aspect of the present invention relates to an aligned carbon nanotube film produced using the separation apparatus and the separation method according to the present embodiment. According to the above-mentioned method and the apparatus according to the present invention, an aligned film consisting of semiconducting carbon nanotubes or metallic carbon nanotubes, or an aligned film in which the ratio of semiconducting carbon nanotubes/metallic carbon nanotubes is within a desired range can be produced by a simple manner using a mixture of semiconducting carbon nanotubes and metallic carbon nanotubes, such as commercially available carbon nanotubes. In addition, according to the present embodiment, it is possible to produce a homogeneous aligned carbon nanotube films over a large area without using crystallization or other processes used in conventional methods for producing aligned films.

The alignment and the thickness of carbon nanotube thin film deposited on the separator (9) can be set to a desired range by adjusting the length of individual carbon nanotubes, the concentration and the degree of dispersion of the carbon nanotube dispersion liquid (3), the flow rate of the liquid feeding pump (5), the suction pressure of each of the two suction pumps (17, 20), and washing time with the dispersion solvent liquid (2).

The film thickness of the aligned film is not particularly limited, and can be selected according to the intended purpose. For example, the method and the apparatus according to the present invention are also suitable for the production of a thin film having a thickness of less than 1000 nm. In one embodiment, the aligned film may be a self-supporting film, with a film thickness of, for example, 10 nm to 100 nm, preferably 50 nm to 100 nm. Also in one embodiment, the aligned film may be a thin film having an ultrathin thickness, with a thickness of, for example, 0.6 nm to 100 nm, more preferably 1.0 nm to 10 nm, more preferably 1 nm to 5 nm. In some cases, the aligned film is a single layer, in other words, the thickness of the aligned film is the same as the diameter of carbon nanotubes.

The weight per unit area of the aligned film is not particularly limited and can be appropriately set according to the intended application of the aligned film. For example, in a case of a thin film of aligned carbon nanotubes, preferably a thin film with a thickness of 1000 nm or less, the weight per unit area of the film is preferably 1 to 20 ng/cm$^2$, more preferably 2 to 10 ng/cm$^2$.

In one embodiment, in the aligned carbon nanotube film, one ends of at least some of carbon nanotube fibers may be curved in an out-of-surface direction of the aligned film due to one ends of the carbon nanotube fibers being fixed in pores of the separator in the production process. Such an aligned carbon nanotube film may have advantages such as an electric field emission source. In another embodiment, the fiber ends protruding to the outside of the surface as described above may be appropriately removed to enhance smoothness.

The aligned film, in particular the aligned film of semiconducting carbon nanotubes, in particular the aligned film having an ultrathin thickness, according to the present embodiment can be suitably used for electronic devices such as FET transistors.

In addition, since the optical anisotropy, the electrical anisotropy, the thermal anisotropy, and the like can be easily controlled by aligning carbon nanotubes, the aligned film of the present embodiment can also be suitably used for applications such as various sensors, such as infrared sensors, gas sensors, and the like, and energy device electrodes.

This application is based upon and claims the benefit of priority from Japanese patent application No. 2019-136031, filed on Jul. 24, 2019, the disclosure of which is incorporated herein in its entirety by reference.

EXAMPLES

Example 1: Separation of Metallic Carbon Nanotubes and Semiconducting Carbon Nanotubes 1. Preparation of Carbon Nanotube Dispersion Liquid A carbon nanotube mixture (carbon nanotubes manufactured by Meijo Nanocarbon Co. (average diameter: about 1.2 nm, average length: about 1 μm), semiconducting carbon nanotubes: metallic carbon nanotubes=2:1 (weight ratio)) was added to a dispersion solvent liquid (0.06 wt % Brij S10 solution), and the carbon nanotubes were dispersed by stirring to obtain a carbon nanotube dispersion liquid (concentration: about 40 wtppb).

2. Separation Apparatus

In the separation apparatus of FIG. 1, a stainless-steel liquid flow adjusting plate (8) of 47 mm×47 mm was used as the upper electrode, the inflow port side thereof being formed in a streamline shape, and the surface thereof having drainboard-shaped grooves extending in the flow direction of the flow path and being arranged at intervals of 0.3 mm. A stainless-steel support screen (10) of 47 mm×47 mm having a mesh-like shape (hole diameter of about 50 μm) was used as the lower electrode. A polycarbonate membrane film (pore diameter of 200 nm) (produced by Advantech Toyo Co., Ltd.) of 47 mm×47 mm was used as the separator (9). The liquid flow adjusting plate (8) and the support screen (10) on which the separator (9) was stacked were caused to face each other so that the tips of the protruding portions of the drainboard-shaped grooves came into close contact with the polycarbonate membrane film and the flow path height was substantially equal to zero, and were accommodated in upper and lower exterior bodies (formed of stainless steel) (8, 22) provided with openings serving as the dispersion liquid inflow port (12), the first collection port (11), and the second collection port (14), and the upper and lower exterior bodies were fixed to each other by clamping bolts (6) with a rubber O-ring (7) interposed therebetween. A DC voltage power supply was connected to the upper and lower exterior bodies so that the liquid flow adjusting plate (8) side served as an anode and the support screen (10) side served as a cathode.

3. Separation of Metallic Carbon Nanotubes and Semiconducting Carbon Nanotubes

The flow rate was controlled by using the liquid feeding pumps (5), the suction pumps (17) and (20), and the liquid flow adjusting valves (16, 19), the total 100 ml of the dispersion liquid of the carbon nanotube mixture from the dispersion liquid container (1) was adjusted so that the ratio between the separated CNT dispersion liquid to be collected in the first collection container (18) and the separated CNT dispersion liquid to be collected in the second collection container (21) was equal to about 1:2, and the dispersion liquid was fed over about 30 minutes. At this time, a voltage of 20 V was applied to the liquid flow adjusting plate (8) and the support screen (10) via the upper and lower exterior bodies.

4. Evaluation of Separated Carbon Nanotubes

The Raman spectra of the dispersion liquid mainly containing metallic carbon nanotubes collected in the first collection container and the dispersion liquid mainly containing semiconducting carbon nanotubes collected in the second collection container were measured (NRS5100 produced by JASCO). Purities were evaluated from the peak areas of RBMs (radial breathing modes) of 130-200 cm$^{-1}$ and 210-300 cm$^{-1}$ which were derived from the semiconducting and metallic carbon nanotubes. Here, it was assumed that the non-processed carbon nanotubes contained semiconducting and metallic carbon nanotubes in a ratio of 2:1. As a result of the processing according to the present invention, the purities of the semiconducting carbon nanotubes and the metallic carbon nanotubes of the carbon nanotubes collected in the respective collection containers were equal to 94 wt % and 75 wt %, respectively. Therefore, the purities of both the semiconducting carbon nanotubes and the metallic carbon nanotubes were enhanced by this separation operation.

Example 2: Production of Aligned Semiconducting Carbon Nanotube Film

1. Preparation of Carbon Nanotube Dispersion Liquid

A carbon nanotube dispersion liquid was prepared in the same manner as Example 1.

2. Production Apparatus for Aligned Film

The same apparatus as the separation apparatus of Example 1 was used as the production apparatus for the aligned film. A voltage was applied so that the liquid flow adjusting plate (8) side served as the cathode and the support screen (10) side served as the anode.

3. Production of Aligned Film (1) The flow rate was controlled by using the liquid feeding pump (5), the suction pumps (17, 20), and the liquid flow adjusting valve (19), the total 100 ml of the dispersion liquid of the carbon nanotube mixture from the dispersion liquid container (1) was adjusted so that the ratio between the separated CNT dispersion liquid to be collected in the first collection container and the separated CNT dispersion liquid to be collected in the second collection container was equal to about 2:1, and the dispersion liquid was fed over about 60 minutes. At this time, a voltage of 5 V was applied to the liquid flow adjusting plate and the support screen (upper and lower exterior bodies).

(2) Next, only the dispersion solvent liquid was caused to flow as the cleaning water (2) under the same condition to remove non-aligned carbon nanotubes and enhance the alignment of the carbon nanotubes fixed onto the surface of the separator.

(3) Next, air was caused to flow through the flow path to dry the carbon nanotube thin film formed on the surface of the separator, and the carbon nanotube thin film was observed with a scanning electron microscope to confirm that the carbon nanotubes had been aligned in the same direction. Then, the aligned carbon nanotube thin film was peeled off from the separator and collected.

4. Evaluation of Produced Aligned Film

It was confirmed for the produced aligned film that one ends of the carbon nanotubes were fixed in the pores of the separator or in the vicinity of the pores, and the carbon nanotubes were aligned in the flow direction. Moreover, when the produced aligned film was evaluated based on the Raman spectrum, the ratio of the semiconducting carbon nanotubes was equal to 94 wt %.

While the invention has been described with reference to example embodiments and examples thereof, the invention is not limited to these embodiments and examples. Various changes that can be understood by those of ordinary skill in the art may be made to forms and details of the present invention without departing from the spirit and scope of the present invention.

Supplementary Note

The whole or part of the example embodiments disclosed above can be described as, but not limited to, the following supplementary notes.

Supplementary Note 1

A carbon nanotube separation method comprising:
a step of preparing a dispersion liquid comprising a mixture of two or more types of carbon nanotubes having different zeta potentials;
a step of introducing the dispersion liquid into a flow path formed between a first electrode having holes for allowing the dispersion liquid to pass therethrough, and a second electrode arranged so as to face the first electrode;
a step of applying a DC voltage to the first electrode and the second electrode while the dispersion liquid is flowing through the flow path; and
a step of continuously collecting a dispersion liquid comprising carbon nanotubes separated to a first electrode side upon application of the voltage from an opposite side to the flow path with respect to the first electrode, and at the same time, continuously collecting a dispersion liquid comprising carbon nanotubes separated to a second electrode side from a downstream side of the flow path.

Supplementary Note 2

The separation method according to Supplementary note 1, wherein the step of continuously collecting a dispersion liquid comprising carbon nanotubes separated to a first electrode side from a first collection port is performed while sucking from the first collection port side.

Supplementary Note 3

The separation method according to Supplementary note 1 or 2, wherein the mixture of two or more types of carbon nanotubes having different zeta potentials is a mixture of metallic single-walled carbon nanotubes and semiconducting single-walled carbon nanotubes.

Supplementary Note 4

The separation method according to any one of Supplementary notes 1 to 3, wherein the second electrode has a shape of a liquid flow adjusting plate having one or a plurality of grooves extending in a flow direction on a surface thereof on a flow path side.

Supplementary Note 5

The separation method according to Supplementary note 4, wherein a flow path inflow port side of the liquid flow adjusting plate has a streamline shape.

Supplementary Note 6

The separation method according to any one of Supplementary notes 1 to 5, wherein a separator is stacked on a flow path side of the first electrode, and a pore diameter of the separator is equal to 1 nm to 1 µm.

Supplementary Note 7

A production method for carbon nanotubes comprising semiconducting single-walled carbon nanotubes of more than 67% by mass using the separation method according to any one of Supplementary notes 1 to 6.

Supplementary Note 8

The production method for carbon nanotubes comprising metallic single-walled carbon nanotubes of more than 34% by mass using the separation method according to any one of Supplementary notes 1 to 6.

Supplementary Note 9

A production method for an aligned carbon nanotube film comprising:
a step of preparing a dispersion liquid comprising a mixture of two or more types of carbon nanotubes having different zeta potentials;
a step of introducing the dispersion liquid into a flow path formed between a first electrode having a separator stacked thereon on a flow path side, and has holes for allowing the dispersion liquid to pass therethrough, and a second electrode arranged so as to face the first electrode;
a step of applying a DC voltage to the first electrode and the second electrode while the dispersion liquid is flowing through the flow path; and
a step of causing a part of a dispersion solvent liquid of the dispersion liquid to permeate through the first electrode, whereby one ends of at least some of carbon nanotubes separated to the first electrode side are fixed in pores of a separator stacked on the first electrode or in the vicinity of the pores, and at the same time, aligning the carbon nanotubes having the one ends fixed to the separator in one direction on the separator by flow of a dispersion liquid flowing in a downstream direction through the flow path.

Supplementary Note 10

A separation apparatus for separating two or more types of carbon nanotubes having different zeta potentials, comprising:
a flow path which is formed between a first electrode having holes for allowing a dispersion liquid to pass therethrough, and a second electrode arranged so as to face the first electrode to cause a dispersion liquid of a mixture of carbon nanotubes to flow therethrough;
a DC voltage power supply for applying one of the first electrode and the second electrode to an anode and applying the other to a cathode; and
a first collection port for collecting a permeating liquid which has passed through the first electrode, and a second collection port provided on a downstream side of the flow path.

Supplementary Note 11

The separation apparatus according to Supplementary note 10, wherein the second electrode has a shape of a liquid flow adjusting plate having a plurality of grooves extending in a flow direction of the flow path on a surface thereof on a flow path side.

Supplementary Note 12

The separation apparatus according to Supplementary note 11, wherein a flow path inflow port side of the liquid flow adjusting plate has a streamline shape.

Supplementary Note 13

The separation apparatus according to any one of Supplementary notes 10 to 12, wherein the DC voltage power supply is a variable DC voltage power supply.

Supplementary Note 14

The separation apparatus according to any one of Supplementary notes 10 to 13 for producing an aligned carbon nanotube film.

INDUSTRIAL APPLICABILITY

The present invention relates to a method for separating specific microparticles from a dispersion solution of microparticles having different properties, and an apparatus therefor. For example, single-walled carbon nanotubes include a mixture of metallic and semiconducting carbon nanotubes. Metallic nanotubes are desirable for applications that require conductivity such as touch panels, and semiconducting nanotubes are used for applications to electronic devices such as electric field transistors. As for a separation technique, a density gradient centrifugation method and an electrophoresis method using adsorption to a gel have already been reported, but some problems remain in practical use. Therefore, establishment of a quick and low-cost separation method for semiconducting-metallic carbon nanotubes is an extremely important basic technique in industry.

EXPLANATION OF REFERENCE

1 Dispersion liquid container
2 Cleaning water
3 Dispersion liquid
4 Three-way cock
5 Liquid feeding pump
6 Clamping bolt
7 O-ring
8 Second electrode (liquid flow adjusting plate) (and exterior body) (anode)
9 Semiconducting-metallic separating separator
10 First electrode (support screen) (cathode)
11 First collection port (collection port 1)
12 Inflow port
13 Flow path
14 Second collection port (collection port 2)
15 DC voltage power supply
16 Liquid flow adjusting valve
17 Suction pump
18 First separated CNT collection container (separated CNT collection container 1)
19 Liquid flow adjusting valve
20 Suction pump
21 Second separated CNT collection container (separated CNT collection container 2)
22 Exterior body
23 Semiconducting carbon nanotubes
24 Metallic carbon nanotubes

The invention claimed is:
1. A carbon nanotube separation method comprising:
preparing a dispersion liquid comprising a mixture of two or more types of carbon nanotubes having different zeta potentials;
introducing the dispersion liquid into a flow path formed between a first electrode having holes for allowing the dispersion liquid to pass therethrough, and a second electrode arranged so as to face the first electrode, wherein a separator is stacked on a flow path side of the first electrode, and a pore diameter of the separator is equal to 50 nm to 20 µm;
applying a DC voltage to the first electrode and the second electrode while the dispersion liquid is flowing through the flow path; and
continuously collecting a dispersion liquid comprising carbon nanotubes separated to a first electrode side upon application of the voltage from an opposite side to the flow path with respect to the first electrode, and at the same time, continuously collecting a dispersion liquid comprising carbon nanotubes separated to a second electrode side from a downstream side of the flow path.
2. The separation method according to claim 1, wherein continuously collecting a dispersion liquid comprising carbon nanotubes separated to a first electrode side from a first collection port is performed while sucking from the first collection port side.
3. The separation method according to claim 1, wherein the mixture of two or more types of carbon nanotubes having different zeta potentials is a mixture of metallic single-walled carbon nanotubes and semiconducting single-walled carbon nanotubes.

4. The separation method according to claim 1, wherein the second electrode has a shape of a liquid flow adjusting plate having one or a plurality of grooves extending in a flow direction on a surface thereof on a flow path side.

5. The separation method according to claim 4, wherein a flow path inflow port side of the liquid flow adjusting plate has a streamline shape, the streamline shape being a shape in which a cross-sectional area of the flow path is represented by a function decreasing monotonically with respect to distance, and a differential function thereof is continuous.

6. A production method for carbon nanotubes comprising semiconducting single-walled carbon nanotubes of more than 67% by mass using the separation method according to claim 1.

7. The production method for carbon nanotubes comprising metallic single-walled carbon nanotubes of more than 34% by mass using the separation method according to claim 1.

8. A production method for an aligned carbon nanotube film comprising:
preparing a dispersion liquid comprising a mixture of two or more types of carbon nanotubes having different zeta potentials;
introducing the dispersion liquid into a flow path formed between a first electrode having a separator stacked thereon on a flow path side, wherein a pore diameter of the separator is equal to 10 nm to 1000 nm, and has holes for allowing the dispersion liquid to pass therethrough, and a second electrode arranged so as to face the first electrode;
applying a DC voltage to the first electrode and the second electrode while the dispersion liquid is flowing through the flow path; and
causing a part of a dispersion solvent liquid of the dispersion liquid to permeate through the first electrode, whereby one ends of at least some of carbon nanotubes separated to the first electrode side are fixed in pores of a separator stacked on the first electrode or in the vicinity of the pores, and at the same time, aligning the carbon nanotubes having the one ends fixed to the separator in one direction on the separator by flow of a dispersion liquid flowing in a downstream direction through the flow path.

9. A separation apparatus for separating two or more types of carbon nanotubes having different zeta potentials, comprising:
a flow path which is formed between a first electrode having holes for allowing a dispersion liquid to pass therethrough, and a second electrode arranged so as to face the first electrode to cause a dispersion liquid of a mixture of carbon nanotubes to flow therethrough;
a separator stacked on a flow path side of the first electrode, wherein a pore diameter of the separator is equal to 50 nm to 20 μm;
a DC voltage power supply for applying one of the first electrode and the second electrode to an anode and applying the other to a cathode; and
a first collection port for collecting a permeating liquid which has passed through the first electrode, and a second collection port provided on a downstream side of the flow path.

10. The separation apparatus according to claim 9, wherein the second electrode has a shape of a liquid flow adjusting plate having a plurality of grooves extending in a flow direction of the flow path on a surface thereof on a flow path side.

11. The separation apparatus according to claim 10, wherein a flow path inflow port side of the liquid flow adjusting plate has a streamline shape, the streamline shape being a shape in which a cross-sectional area of the flow path is represented by a function decreasing monotonically with respect to distance, and a differential function thereof is continuous.

12. The separation apparatus according to claim 9, wherein the DC voltage power supply is a variable DC voltage power supply.

13. The separation apparatus according to claim 9 for producing an aligned carbon nanotube film.

14. The separation method according to claim 1, wherein the pore diameter of the separator is equal to 100 nm to 10 μm.

15. The separation method according to claim 14, wherein the pore diameter of the separator is equal to 200 nm to 1 μm.

16. The separation apparatus according to claim 9, wherein the pore diameter of the separator is equal to 100 nm to 10 μm.

17. The separation apparatus according to claim 16, wherein the pore diameter of the separator is equal to 200 nm to 1 μm.

18. The production method according to claim 8, wherein the pore diameter of the separator is equal to 50 nm to 800 nm.

19. The production method according to claim 18, wherein the pore diameter of the separator is equal to 100 nm to 500 nm.

* * * * *